June 7, 1949. L. C. CHOUINGS 2,472,695
SYSTEM OPERATED BY LIQUID PRESSURE
Filed Jan. 1, 1945 3 Sheets-Sheet 1

INVENTOR.
LESLIE CYRIL CHOUINGS
BY Cecil F Arens
ATTORNEY

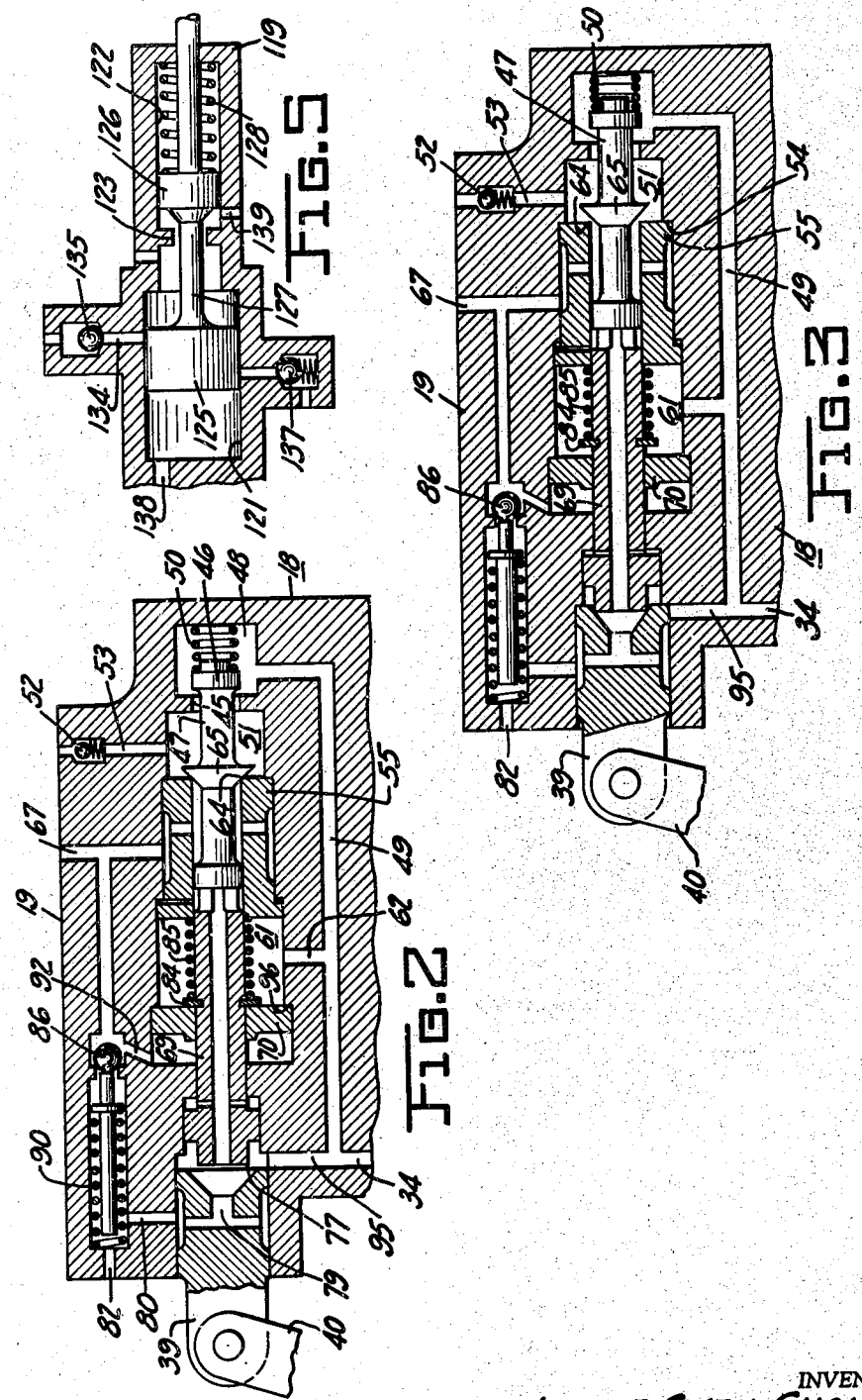

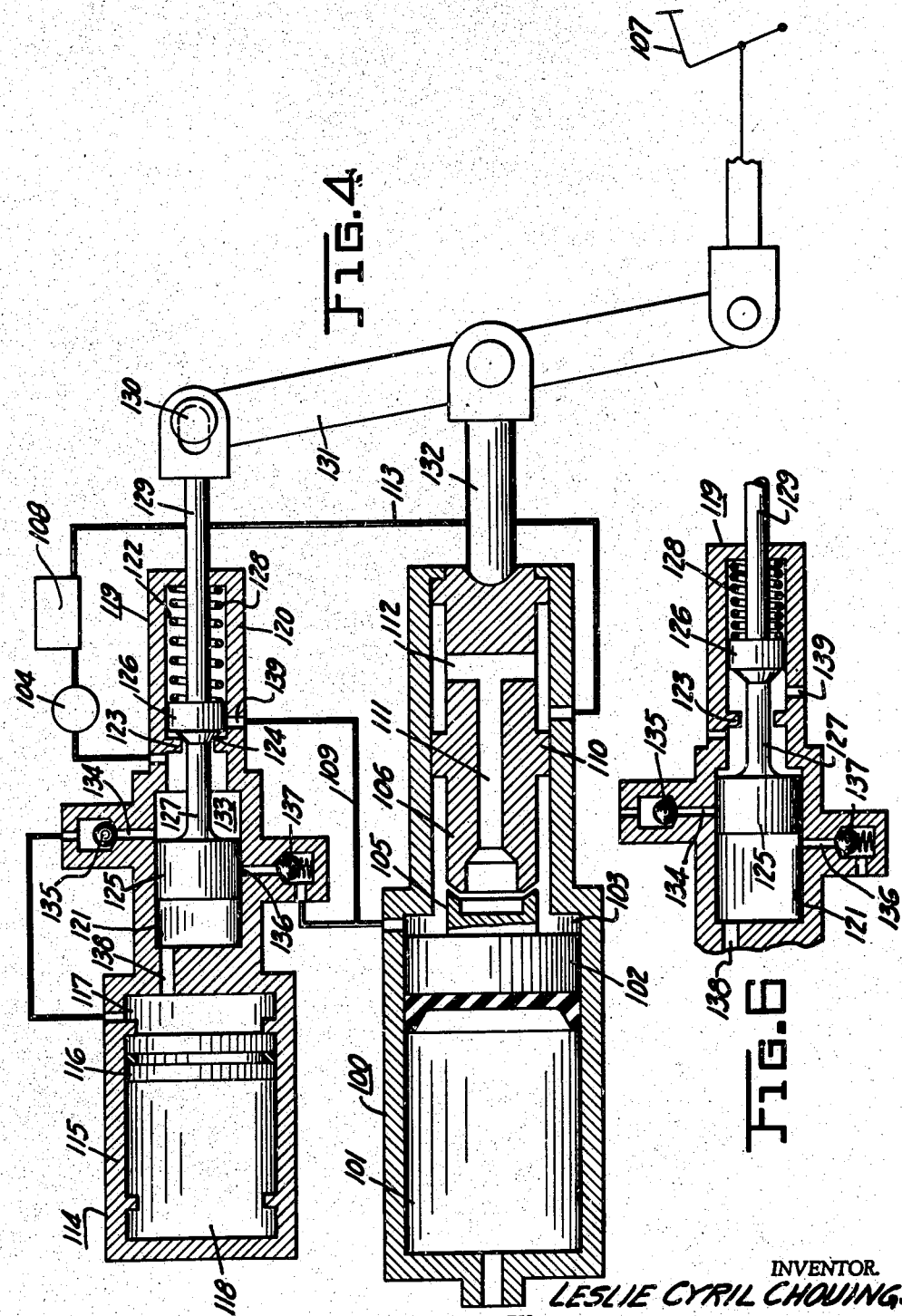

Patented June 7, 1949

2,472,695

UNITED STATES PATENT OFFICE 2,472,695

SYSTEM OPERATED BY LIQUID PRESSURE

Leslie Cyril Chouings, Leamington Spa, England, assignor to Automotive Products Company Limited, Leamington Spa, England Application January 1, 1945, Serial No. 570,995
In Great Britain August 9, 1943

5 Claims. (Cl. 60—51)

This invention relates to liquid pressure supply systems, and particularly to those of the kind (herein mentioned as the kind referred to) in which the delivery of a continuously running pump is connected with the pressure outlet of the system, but the pump is provided with a by-pass passage having a control valve which is normally open, the liquid then being free to circulate idly through the pump without building up working pressure in the outlet, until such time as the control valve is operated to close the by-pass passage partly or completely.

The invention is of particular utility in connection with liquid pressure braking systems where the source of pressure liquid comprises a continuously operating pump, usually driven by the transmission system or wheels of the vehicle. In braking systems of this kind difficulty has been experienced due to the sluggish operation of the brakes when the vehicle is travelling slowly; in fact there is sometimes a distinct lapse of time between the actuation of the brake pedal and the application of the brakes, due to the fact that the clearance of the usual brake shoes has to be taken up by the relatively slow stream of liquid being delivered by the pump.

It is the object of the invention to provide an improved form of liquid pressure supply system.

It is a further object of the invention to provide an improved brake system in which the above difficulty is avoided by the inclusion of an accumulator adapted to come into operation automatically when the supply of pressure liquid is inadequate to provide a responsive braking action.

In a liquid pressure supply system of the kind referred to, according to the invention a hydraulic accumulator, fed with pressure liquid from the pump, has its outlet connected with the outlet of the system through a valve which is opened by closing movement of the control valve. Preferably a pressure regulating valve device is interposed between the pump outlet and the hydraulic accumulator to limit the pressure received by said accumulator; also an auxiliary valve can conveniently be disposed between the pump outlet and the control valve, said valve being arranged to prevent the flow of pressure liquid to the by-pass passage when the accumulator is being charged.

In a liquid pressure supply system of the kind referred to, according to a further feature of the invention a hydraulic accumulator is fed from the pump through a pressure regulating valve device, which latter is operatively connected with an auxiliary valve arranged to prevent pressure liquid from flowing to the by-pass passage, the auxiliary valve being automatically opened by the pressure regulating valve when the pressure in the accumulator reaches a predetermined value.

The auxiliary valve can be opened by closing movement of the control valve. Moreover the pressure regulating valve is preferably of the type comprising a pressure responsive valve and an automatic cut-off valve, the former being spring influenced to open when the accumulator pressure reaches a predetermined value, thus causing pressure liquid to be fed to the cut-off valve so as to close the latter.

If desired the control valve, the auxiliary valve and the cut-off valve may all be disposed coaxially within a bore in a common housing. The cut-off valve can comprise a fixed body having a bore, a valve sleeve slidable within said bore, and a headed valve member which is arranged to slide axially into seating engagement with the valve sleeve, the valve sleeve being urged axially by pressure liquid delivered by the pump, thus breaking the seating engagement and allowing said pressure liquid to flow to the accumulator.

The invention is illustrated by way of example in the accompanying diagrammatic drawings, in which:

Figure 2 is a fragmentary sectional view of the control valve device showing the position occupied by the parts when the accumulator is fully charged but the brakes are off;

Figure 3 is a similar view showing the position of the parts when the pump is running slowly and the accumulator is in action;

Figure 4 is a sectional view of a modified form of system;

Figure 5 is a fragmentary sectional view showing the position of the parts when the accumulator is fully charged; and Figure 6 is a similar view showing the position of the parts when the brakes are applied.

Figure 1:
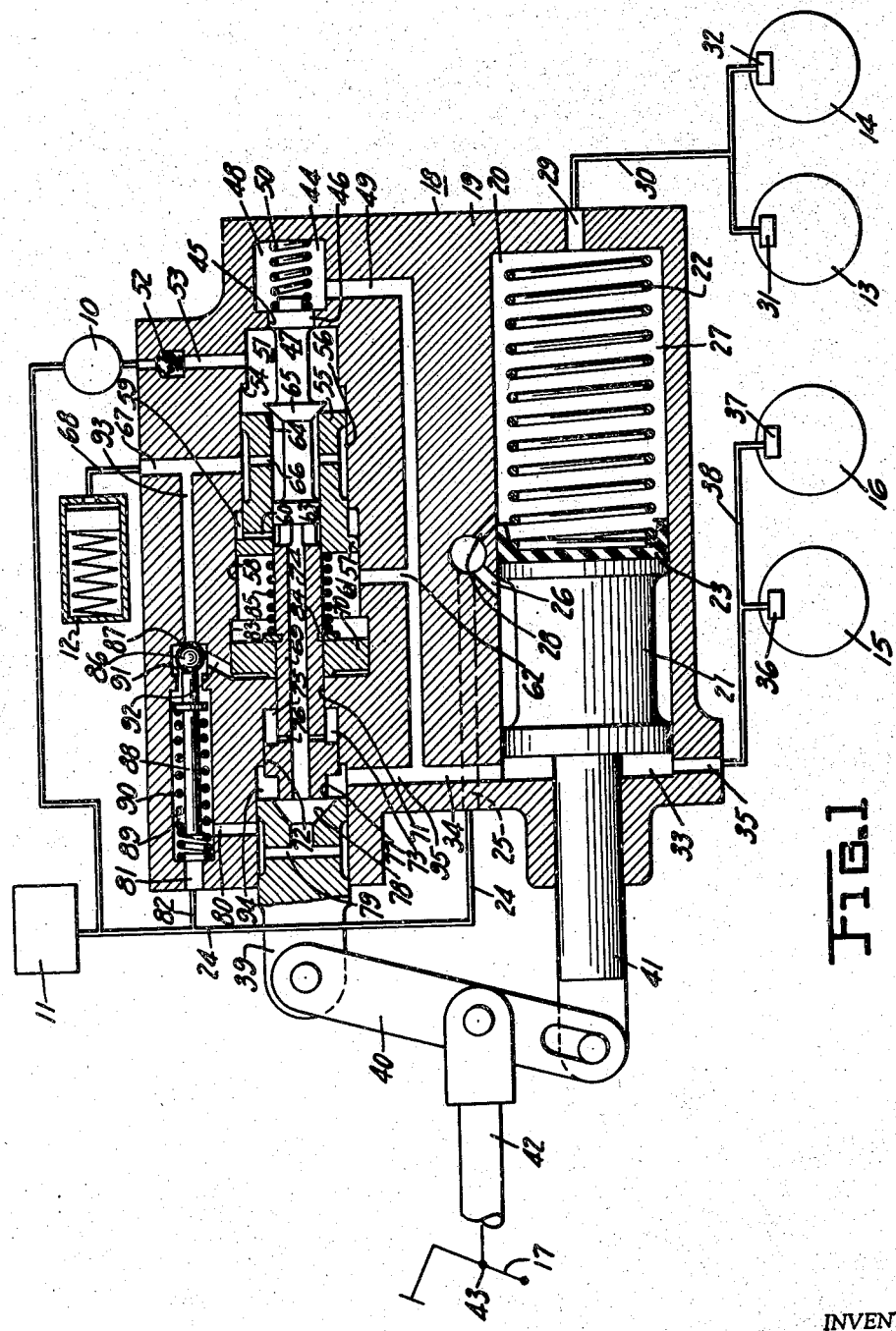
Figure 1 is a sectional elevation showing a control unit applied to the hydraulic braking system of a vehicle, various components of the system being shown to a reduced scale.

The form of liquid pressure supply system shown in Figures 1 to 3 is applied to a hydraulic braking system of a vehicle and comprises briefly a pump 10 which is driven continuously, say from the vehicle transmission, a liquid reservoir 11 the contents of which are at atmospheric pressure, a hydraulic accumulator 12, a pair of rear wheel brakes 13 and 14, a pair of front wheel brakes 15 and 16, and a brake-applying pedal lever 17. These parts, which are all shown diagrammatically to a small scale in Figure 1, are operatively associated with a combined control and master cylinder unit indicated generally at 18.

This combined unit comprises a body 19, the lower part of which has a master cylinder bore 20 containing an axially slidable piston member 21 of the usual design, said piston member 21 being urged to its retracted position by a coiled compression spring 22 and having a rubber or like packing cup 23. A pipe 24 from the reservoir 11 leads into the cylinder space behind the packing cup 23 by way of passages 25 and 26, while it also communicates with the working space 27 ahead of the piston member 21 through a hole 28 of small diameter adapted to be closed by the packing cup 23 at the commencement of the advancing stroke of the piston 21. The outlet from the working space 27 is indicated at 29 and is connected by a pipe 30 with the usual hydraulic motor cylinders 31 and 32 for operating the brakes 13 and 14.

Hydraulic pressure from the pump 10 is normally utilised for advancing the piston 21, pressure liquid from the pump 10 being admitted to an annular working space 33 by way of control valve mechanism disposed in the upper part of the body 19 and a passage 34 which is herein referred to as the outlet of the liquid pressure supply system. The pressure liquid from the passage 34 is also used to apply the brakes 15 and 16 directly, a connection 35 being taken from the working space 33 and leading to the motor units 36 and 37 of the brakes 15 and 16 respectively by way of a pipe 38. The externally operated part of the control valve mechanism generally comprises a plunger 39 which, as will be hereinafter described, requires to be pushed inwards in order to bring about the delivery of pressure liquid through the passage 34. As it is desired that the system shall have a hunting or follow-up action, the plunger 39 is connected by a link 40 with a piston rod 41 attached to the piston 21; intermediate its ends the link 40 is attached to a push rod 42. which latter is connected pivotally at 43 with the pedal lever 17. Thus as the pedal lever 17 is depressed the piston rod 41 initially acts as a fulcrum for the link 40, so that the upper end of said link pushes the plunger 39 inwards, i. e. to the right. This results in movement of the piston 21 and piston rod 41 towards the right, and if the pedal lever 17 is held steady the link 40 pivots upon the end of the push rod 42 and consequently shifts the plunger 39 outwards, i. e. towards the left, thus tending to shut off the supply of pressure liquid through the passage 34.

The control valve mechanism included within the unit 18 is mainly disposed within a single bore formed in the body 19, said bore being indicated generally at 44, but having several portions of various diameters which will be referred to individually hereinafter. Adjacent its right-hand end the bore 44 has an inwardly directed flange defining a short cylindrical passage 45, which latter is arranged to be closed in a substantially liquid-tight manner by a cylindrical head 46 upon a valve member 47, this being herein termed the auxiliary valve. To the right of the passage 45 the bore 44 has a chamber 48, which latter is connected by a passage 49 with the outlet passage 34, said chamber being fitted with a coiled compression spring 50 acting to urge the valve member 47 towards the left. Beyond the passage 45 the bore 44 is enlarged to form a chamber 51, which is fed with pressure liquid from the pump 10 by way of a non-return valve 52 and a passage 53. At this part the bore 44 has a stop shoulder 54 adapted to be engaged on occasion by a valve sleeve 55, which latter is slidable in a liquid-tight manner within the portion 56 of the bore 44; its left-hand end, however, is enlarged, as indicated at 57, and slides also in a liquid-tight manner within the correspondingly enlarged portion 58 of the bore 44. The resultant annular space 59 is vented by a radial passage 60, which is in permanent communication with the reservoir 11, as will be hereinafter apparent, while the chamber 61 within the portion 58 of the bore 44 is connected with the passage 49 by a branch 62. The valve member 47 has its stem enlarged at 63 to slide in a liquid-tight manner within the bore of the valve sleeve 55, and the end of said bore is arranged to provide a seating 64 for a frusto-conical head 65 formed upon the valve member 47 about halfway along its length. The bore of the valve sleeve 55 is connected by radial passages 66 with a passage 67 in the body 19 leading to the hydraulic accumulator 12 by way of a pipe 68.

The left-hand end of the valve sleeve 55 is slidably engaged by a plunger member 69, which latter is of uniform diameter for nearly its whole length and is slidable in a liquid-tight manner within an annular stop piston 70 and within a passage 71 forming part of the bore 44; the plunger member 69 has, however, adjacent its left-hand end an enlarged cylindrical head 72 which slides in a liquid-tight manner within a portion 73 of the bore 44. The plunger member 69 has a longitudinal passage 74, which is in free communication with the vent passage 60 (for which purpose the end of the plunger member 69 is slotted as shown), while the annular space 75 within the bore 73 is vented in a similar manner by radial passages 76. The left-hand end of the plunger member 69 has an external annular seating 77 arranged to be engaged in a substantially liquid-tight manner by a frusto-conical surface 78 formed within the plunger 39, the space within said surface 78 being connected permanently with the reservoir 11 by way of passages 79, 80 and 81 and thence by a branch pipe 82 to the pipe 24. The annular space 94 surrounding the end part of the plunger member 69 is in permanent connection with a passage 95 forming an extension of the outlet 34. The passages 95, 79, 80 and 81 together constitute a by-pass passage which connects the outlet 34 with the reservoir whenever the control valve 39, 69 is open.

The stop piston 70 is of relatively large diameter and is slidable in a liquid-tight manner within a portion 83 of the bore 44. As above mentioned, the stop piston 70 is also slidable upon the plunger member 69, its main function being, however, to control the position of the plunger member 69 and thus actuate the valve member 47. For this purpose the plunger member 69 is provided with a flange 84, which is adapted to co-operate with the stop piston 70 and also forms an abutment for a coiled compression spring 85, the opposite end of the latter bearing against the valve sleeve 55; the spring 85 is arranged to exert less axial thrust than the coiled compression spring 50.

The unit 18 also includes a pressure responsive valve comprising a ball 86, which is urged to the right to close a small seating 87 by a plunger 88 disposed within a passage 89 and acted upon by a coiled compression spring 90. The passage 89 is constricted to form a seat 91 which is larger in diameter than the seat 87, the intervening chamber being connected by a passage 92 with the working space at the left-hand side of the stop piston 70. A passage 93 leads from the seating 87 to the passage 67 forming the accumulator connection.

It will be noted that the diameter of the head 46 is equal to the diameter of the seating 64, so that the valve member 47 is balanced with respect to liquid pressure within the chamber 51. Moreover the total cross-sectional area of the head 72 is twice the cross-sectional area defined by the seating 77, so that when the plunger 39 is in engagement with the left-hand end of the plunger member 69, the force exerted upon the exposed annular end surface of the head 72 by liquid in the passage 34 exactly counterbalances the force exerted by said liquid within the chamber 48 upon the head 46. As mentioned above, the left-hand end surface of the valve sleeve 55 exposed to liquid pressure in the chamber 61 is greater than the corresponding surface at the right-hand end of said valve sleeve 55, so that when the auxiliary valve 45, 46 is open, and equal pressures exist in the chambers 48 and 61, there will be a resultant fluid force on the valve sleeve 55 urging the latter to the right. It will of course be appreciated that the head 65 of the valve member 47 and the valve sleeve 55 together constitute what is herein termed the cut-off valve. Also the control valve comprises the plunger 39 and the left-hand part of the plunger member 69.

The manner in which the system operates will now be described. When the pump 10 is inoperative and the accumulator 12 is completely empty the various parts assume the positions shown in Figure 1, the valve member 47 being urged to its left-hand position by the spring 50 so that the head 46 blocks the passage 45; this causes the head 65 to seat upon the valve sleeve 55 and push the latter to the left against the action of the spring 85. The stop piston 70 is in its left-hand position and is, of course, engaged by the flange 84 under the action of the spring 85. The pressure responsive ball 86 is urged against its smaller seating 87 by the spring 90. When the pump 10 is driven, pressure liquid passes through the non-return valve 52 and the passage 53 into the chamber 51; as the valve member is balanced with respect to such pressure liquid the head 46 remains in its closed position and the pressure liquid acts upon the right-hand end surface of the valve sleeve 55, thus moving the latter to the left against the action of the spring 85 and allowing pressure liquid to flow past the seating 64 through the passages 66 and 67 into the accumulator 12. As the accumulator becomes charged the pressure in the passage 67 progressively rises, but when a predetermined value is reached, depending upon the strength of the spring 90, the ball 86 is pushed off the seating 87 by the pressure liquid and is caused to engage with the seating 91. This allows pressure liquid to flow through the passage 92 and to act on the left-hand face of the stop piston 70 with sufficient force to shift said stop piston 70 to its right hand position against a shoulder 96. The parts then assume the positions shown in Figure 2. The plunger member 69 is, of course, moved to the right owing to the engagement of the stop piston 70 with the flange 84, so that the valve member 47 is also moved to the right, thus displacing the head 46 beyond the passage 45. Owing partly to the spring 85 and partly to the superior effect of the liquid pressure in the chamber 61, the valve sleeve 55 follows the head 65, which latter thus closes the seating 64. Liquid entering the chamber 51 from the pump is now able to escape freely past the head 46, along the passage 49, and through the by-pass passages 95, 79, 80 and 82, back to the reservoir 11, so that no substantial pressure is generated in the pump and the latter can thus run idly without undue wastage of power. It will be clear that when the pedal lever 17 is depressed, to move inwards the plunger 39 of the control valve, the by-pass passage 95, 79, 80, 82 is stopped completely at the seating 77, or is at least severely restricted thereat, thus causing the pump to build up pressure in the outlet passage 34 and consequently advance the piston 21 as above described to generate brake-applying pressure in the working space 27 (see Figure 1). It will also be noted that when once the auxiliary valve 45, 46 has been opened by movement of the stop piston 70 to the right, the fluid pressure in the chamber 61 is substantially equal to that in the chamber 51; as a result this fluid pressure urges the valves sleeve 55 to the right, and this prevents further liquid flowing from the pump passage 53 to the accumulator passage 67.

If the pump 10 should be running slowly when the brake is applied the rise in pressure in the outlet 34 due to the closing of the control valve 39, 69 will of course be too slow to produce an efficient braking action, and the driver would instinctively press further upon the pedal lever 17, thus causing the plunger 39 to move the plunger member 69 to the right, as is shown in Figure 3. As the valve sleeve 55 is in engagement with the shoulder 54 the frusto-conical head 65 of the valve member 47 separates from the seating 64 and allows liquid to flow from the accumulator, through the passage 67 into the chamber 51 so as to augment the output from the pump 10. The effect of this is most advantageous in braking systems where a relatively large volume of liquid at low pressure is normally required to take up the clearance between the brake shoes and the drums, for the accumulator supplies this requirement practically instantaneously, whereas the pump would take a substantial time to displace the corresponding volume of liquid when said pump is running slowly. It is for this reason that the pressure responsive valve 86 is normally set so that the maximum pressure in the accumulator is substantially less than the normal working pressure of the brake system. When the brakes are released the valve member 47, of course, returns to the position shown in Figure 1 so as to enable the accumulator 12 to be recharged by the pump 10, whereupon the parts revert to the positions shown in Figure 2.

Where a follow-up action is not required, the motor cylinder may be entirely separate and unconnected mechanically with the pedal, the pedal lever 17 being coupled to the plunger 39 of the control device 18 through a spring (not shown) which is loaded when the pedal is depressed, the resulting liquid pressure tending to open the valve 39, 69 against the spring load.

The system shown in Figures 4, 5 and 6 incorporates a master cylinder unit 100 of the form shown in my patent specification No. 2,318,756 dated May 11, 1943. It comprises, as a unit, a hydraulic master cylinder 101 having a piston 102 which, when advanced, feeds pressure liquid to the brakes (not shown); the space 103 behind the piston is fed with liquid from a continuously driven pump 104, through a pipe 109, and accommodates a control valve 105, 106 which is closed by operating the usual brake pedal 107, thereby causing liquid pressure to build up behind the piston 102 of the master cylinder, said piston thereby being advanced. A component of the force exerted hydraulically upon the piston 102 of the master cylinder is caused to react upon a piston 110 and thus upon the brake pedal 107 to indicate to the operator the strength of the brake application. When the brake pedal 107 is free, the control valve 105, 106 is open and the output from the pump passes freely back to the usual reservoir 108 by way of passages 111 and 112 and pipe 113.

In the present system a hydraulic accumulator 114 is provided; this can be of the usual form comprising a cylinder 115 with a piston 116 defining a variable volume working space 117, said piston being urged by resilient means (such as compressed gas or other spring in chamber 118) to reduce the volume of said space 117.

A cut-off valve, indicated at 119, is provided for the accumulator and comprises a body 120 having a bore composed of a large diameter portion 121 and a coaxial small diameter portion 122; adjacent the inner end of the small diameter portion an inwardly directed annular flange 123 provides a valve seating 124 of yet smaller diameter. A piston valve member, comprising a large piston 125 and a small piston 126, is slidably mounted in the respective bores, said pistons preferably being a lapped fit to prevent liquid leakage past them. They are rigidly connected together by a thin stem 127 passing with clearance through the valve seating, and the small piston 126 is formed adjacent the stem with a frusto-conical portion arranged to engage with the seating 124, thus sealing the latter and also limiting the movement of the small piston in a direction towards the larger portion 121 of the bore. The pistons 125, 126 are urged in this direction by a coiled compression spring 128 within the small bore. Also an operating rod 129 extends from the small piston axially through the spring 128 and the end wall of the small bore, the projecting portion of said rod 129 being connected by a pin and slot or other lost motion device 130 with one end of a floating lever 131. The other end of said lever is arranged to be operated by the brake pedal 107 or equivalent, and the middle part of the lever is operatively connected by a thrust member 132 with the valve device 105, 106 of the operating unit 100. During the main part of the brake-applying movement, the floating lever 131 fulcrums upon the operating rod 129 of the cut-out valve, thus urging forwards the valve member 106 of the operating device 100 as the piston of the master cylinder is advanced by the liquid pressure.

The two pistons 125 and 126 operate in conjunction with the following ports and connections. The pump delivery is connected permanently with the space 133 between the large piston 125 and the flange 123. The large bore 121 is provided at a position near its "inner" end with a first port 134 connected through a non-return valve 135 with the hydraulic accumulator 114, and further along with a second port 136 connected, also through a non-return valve 137, with the working space 103 behind the piston 102 of the master cylinder; both of these ports are arranged to be controlled by the large piston 125 of the cut-off valve. The "outer" part of the large bore is directly connected with the hydraulic accumulator at 138. At a position just beyond the valve seating 124 the small bore 122 is formed with a third port 139 connected directly by the pipe 109 with the working space 103 behind the piston 102 of the master cylinder.

The operation of the cut-off valve is briefly as follows. When the system is inactive the coiled compression spring of the cut-out valve urges the pistons to an end position, as shown in Figure 4, in which the third port 139 and the valve seating 124 are both closed by the small piston 126, and the second port 136 is closed by the large piston 125; the first port 134 is free of the large piston and connects the pump 104 with the accumulator space 117. When the pump 104 is driven, therefore, due to running of the vehicle the accumulator 114 becomes charged. When a predetermined pressure is reached in the accumulator said pressure (which in effect acts on the piston valve member over an area equal to the circle within the valve seat 124) moves the piston valve member 125, 126, 127 against the spring 128. The first effect is to enable the pump pressure to act upon the whole cross-sectional area of the small piston 126, thus causing the piston valve member 125, 126, 127 to be moved smartly to its intermediate position, as shown in Figure 5. The accumulator 114 is thereby disconnected from the pump 104, and the latter becomes connected with the operating device of the brake, through the valve seat 124 and the third port 139 of the cut-off valve. This movement of the valve member is permitted by the lost motion device 130 and therefore does not have to be accompanied by movement of the floating lever 131.

When the brake pedal 107 is operated to apply the brakes, the thrust rod 132 of the operating device, after an initial movement to close the valve device 105, 106 acts as a fulcrum for the floating lever 131 so that the initial movement of the pedal causes the floating lever 131 to move the piston valve member 125, 126, 127 against its spring 128 until the end position, shown in Figure 6, is reached; the large piston 125 has then closed the first port 134 to isolate the accumulator 114 from the pump and has opened the second port 136, enabling the pressure liquid to flow from the accumulator space 117, through the non-return valve 137, to the working space 103 of the operating device, that is, if and so long as the liquid pressure in said space 103 (which is also being fed by the pump 104 through the valve seating 124 and third port 139) is less than that in the accumulator 114. This enables a copious supply of pressure liquid to be available immediately the brake pedal is operated, even although the pump 104 may be running slowly; moreover only sufficient liquid is discharged from the accumulator 114 to make up the initial deficiency in pressure within the operating device 100, for as the pressure builds up in the working space 103, said pressure acts also to urge the piston valve member so that the large piston 125 covers the second port 136, thus isolating the accumulator 114 from the operating device 100. This action may be arranged to take place when any desired brake-applying pressure is reached, which pressure may be less than that in the accumulator 114, depending upon the areas of the parts and the strength of the compression spring 128. The non-return valve 137 ensures that the pressure liquid in the operating device 100 cannot feed back into the accumulator 114 as the brake-applying pressure increases. The fact that the large piston 125 of the cut-off valve 119 always closes the first port 134 during a brake application prevents any part of the pump delivery from passing into the accumulator 114, and ensures that the whole output of the pump is available for applying the brakes. As soon as the brake pedal 107 is released, the cut-off valve member 125, 126, 127 is allowed to return to its initial end position, shown in Figure 4, so that the pump 104 then replenishes the accumulator; if the accumulator was not required for the brake application (owing to the pump output being adequate) then the cut-off valve member reverts to its intermediate position, shown in Figure 5, when the pedal is released.

It will be understood that the above systems have been described merely as examples of the invention, and various modifications may be made in the design and arrangement of the parts. In either case the cut-off valve may be incorporated in the operating device, or in the accumulator, or the whole may be combined to form a single unit; alternatively each may be separate, convenient means such as mechanical linkage or even a hydraulic remote control device being used to actuate the cut-off valve device during the initial part of the applying movement of the brake pedal or equivalent.

The invention is moreover not limited to brake systems, as it is applicable to any liquid pressure supply system, such, for instance, as those which are used for operating remote controls on aircraft and in many industrial applications.

What I claim is:

1. For use in a fluid pressure system having a pump for putting fluid under pressure, an accumulator for storing fluid under pressure and a device to be operated by the fluid under pressure which comes either directly from the pump or from the pump and accumulator jointly, a control mechanism comprising a pressure regulating valve interposed between the pump and the accumulator and constructed and arranged to limit the pressure received by said accumulator, a passage constructed and arranged so that it receives fluid under pressure from the pump and returns the fluid to the inlet side of the pump, a control valve in the passage and normally open and constructed and arranged to be closed to obstruct the return of fluid to the inlet of said pump so as to subject said device to fluid under pressure, and an auxiliary valve disposed in said passage between the pump and the control valve and normally closed, said auxiliary valve being constructed and arranged to prevent the flow of fluid from the pump to said passage when the accumulator is being charged.

2. For use in a fluid pressure system having a pump for putting fluid under pressure, an accumulator for storing fluid under pressure and a device to be operated by the fluid under pressure which comes either directly from the pump or from the pump and accumulator jointly, a control mechanism comprising a pressure regulating valve interposed between the pump and the accumulator and constructed and arranged to limit the pressure received by said accumulator, a passage contsructed and arranged so that it receives fluid under pressure from the pump and returns the fluid to the inlet of said pump, a control valve in the passage and normally open and constructed and arranged to be closed to obstruct the return of fluid to the inlet of said pump so as to subject said device to fluid under pressure, and an auxiliary valve disposed in said passage between the pump and the control valve and normally closed, said auxiliary valve being constructed and arranged to prevent the flow of fluid from the pump to said passage when the accumulator is being charged, said pressure regulating valve including means responsive to pressure for automatically opening said auxiliary valve, said pressure regulating valve being so constituted that when the accumulator pressure reaches a predetermined value the accumulator pressure is made to act on said last named means to open said auxiliary valve whereby fluid is freely admitted from the pump outlet to said passage.

3. A control mechanism as claimed in claim 2, wherein the control valve is constructed and arranged so that closing movement thereof to close said passage further opens the auxiliary valve and connects the device to the pump and accumulator pressures jointly.

4. For use in a fluid pressure system having a pump for putting fluid under pressure, an accumulator for storing fluid under pressure and a device to be operated by the fluid under pressure which comes either directly from the pump or from the pump and accumulator jointly, a control mechanism comprising a pressure regulating valve interposed between the pump and the accumulator and constructed and arranged to limit the pressure received by said accumulator, a passage constructed and arranged so that it receives fluid under pressure from the pump and returns the fluid to the inlet of said pump, a control valve in the passage and normally open and constructed and arranged to be closed to obstruct the return of fluid to the inlet of said pump so as to subject said device to fluid under pressure, and an auxiliary valve disposed in said passage between the pump and the control valve and normally closed and constructed and arranged to prevent the flow of fluid from the pump to said passage when the accumulator is being charged, said pressure regulating valve comprising a pressure responsive valve and an automatic cut-off valve the latter of which is spring urged to closed position and constructed and arranged to be urged to open position against said spring during a period of charging the accumulator, said pressure responsive valve constructed and arranged to by-pass fluid under pressure from the accumulator to cause the accumulator pressure to act on said cut-off valve to increase the spring force of said spring to tend to close said cut-off valve when the accumulator pressure reaches a predetermined value, said auxiliary valve being operatively connected to said cut-off valve so that when the latter valve is closed in response to a predetermined accumulator pressure the auxiliary valve is opened.

5. A control mechanism as claimed in claim 4 wherein the control valve, the auxiliary valve and the cut-off valve are all disposed coaxially in a common housing for simultaneous movement.

LESLIE CYRIL CHOUINGS.

REFERENCES CITED

The following references are of record in the file of this patent:

UNITED STATES PATENTS

| Number | Name | Date |
| --- | --- | --- |
| 1,650,338 | Fornaca | Nov. 22, 1927 |
| 1,774,836 | Lormüller | Sept. 2, 1930 |
| 1,886,309 | Scott | Nov. 1, 1932 |
| 2,239,566 | Mercier | Apr. 22, 1941 |
| 2,400,039 | Burnett | May 7, 1946 |

FOREIGN PATENTS

| Number | Country | Date |
| --- | --- | --- |
| 443,448 | Great Britain | Feb. 28, 1936 |
| 476,490 | Great Britain | Dec. 6, 1937 |